US008865107B2

(12) United States Patent
Hersam et al.

(10) Patent No.: US 8,865,107 B2
(45) Date of Patent: Oct. 21, 2014

(54) HIGHLY CONCENTRATED NANO-REINFORCEMENT SUSPENSIONS FOR CEMENTITIOUS MATERIALS AND METHOD OF REINFORCING SUCH MATERIALS

(75) Inventors: Mark C. Hersam, Wilmette, IL (US); Jung-Woo T. Seo, Evanston, IL (US); Surendra P. Shah, Evanston, IL (US); Maria S. Konsta-Gdoutos, Wilmette, IL (US); Zoi S. Metaxa, Kavala (GR)

(73) Assignee: Northwestern University, Evanston, IL (US)

(*) Notice: Subject to any disclaimer, the term of this patent is extended or adjusted under 35 U.S.C. 154(b) by 0 days.

(21) Appl. No.: 13/135,004

(22) Filed: Jun. 22, 2011

(65) Prior Publication Data
US 2012/0042806 A1 Feb. 23, 2012

Related U.S. Application Data

(63) Continuation-in-part of application No. 12/322,842, filed on Feb. 6, 2009.

(60) Provisional application No. 61/027,160, filed on Feb. 8, 2008.

(51) Int. Cl.
*C01B 31/02* (2006.01)
*C04B 28/02* (2006.01)
*C04B 14/02* (2006.01)
*C04B 40/00* (2006.01)
*C04B 111/34* (2006.01)

(52) U.S. Cl.
CPC .................. *C04B 28/02* (2013.01); *C01B 31/02* (2013.01); *C01B 2202/06* (2013.01); *C04B 14/024* (2013.01); *C04B 14/026* (2013.01); *C04B 40/0039* (2013.01); *C04B 2111/34* (2013.01)
USPC ..................................... 423/447.2

(58) Field of Classification Search
USPC .................... 423/445 B, 445 R, 447.2
See application file for complete search history.

(56) References Cited

U.S. PATENT DOCUMENTS

2008/0290007 A1* 11/2008 Fagan et al. .................. 209/659
2009/0035469 A1* 2/2009 Sue et al. ...................... 427/282
2010/0044646 A1* 2/2010 Zhamu et al. ................ 252/511

OTHER PUBLICATIONS

Band Gap Fluorescence from Individual Single-Walled Carbon Nanotubes Michael J. O'Connell, et al. Science Jul. 26, 2002: 297 (5581), 593-596. [DOI:10.1126/science.1072631].*
Blum, C., Stürzl, N., Hennrich, F., Lebedkin, S., Heeg, S., Dumlich, H., . . . & Kappes, M. M. (2011). Selective Bundling of Zigzag Single-Walled Carbon Nanotubes. ACS nano, 5(4), 2847.*
Fabrication of High-Concentration and Stable Aqueous Suspensions of Graphene Nanosheets by Noncovalent Functionalization with Lignin and Cellulose Derivatives Qiang Yang, Xuejun Pan, Fang Huang, and Kecheng Li The Journal of Physical Chemistry C 2010 114 (9), 3811-3816.*
Antaris, A.L., et al., "Sorting single-walled carbon nanotubes by electronic type using nonionic, biocompatible block copoymers", ACS Nano 2010, vol. 4, pp. 4725-4732.
Metaxa, Z.S., et al., "Carbon nanotubes reinforced concrete", ACI Special Publication 267, 2009, pp. 11-20.

(Continued)

Primary Examiner — Richard M Rump

(57) ABSTRACT

Highly concentrated carbon nanotube or other nano-reinforcement suspensions and/or masses are prepared for use as admixtures in cement base materials to make cementitious composite materials.

9 Claims, 7 Drawing Sheets

(56) References Cited

OTHER PUBLICATIONS

Metaxa, Z.S., et al., "Mechanical properties and nanostructure of cement-based materials reinforced with carbon nanofibers and polyvinyl alcohol (PVA) microfibers", ACI Special Publication 270, 2010, pp. 115-124.

Yu, J., et al., "Controlling the dispersion of multi-wall carbon nanotubes in aqueous surfactant solution", Carbon 2007, vol. 44, pp. 618-623.

Konsta-Gdoutos, M.S., et al., "Multi-scale mechical and fracture characteristics and early-age strain capacity of high performance carbon nanotube/cement nanocomposites", Cem. Concr. Compos. 2010, vol. 32, pp. 110-115.

Konsta-Gdoutos, M.S., et al., "Highly dispersed carbon nanotube reinforced cement based materials", Cem. Concr. Res. 2010, vol. 40, pp. 1052-1059.

Hummers, W.S., et al., "Preparation of Graphitic Oxide", J. Am. Chem. Soc. 1958, vol. 80, p. 1339.

Liang, Y.T., et al., "Highly concentrated graphene solutions via polymer enhanced solvent exfoliation and iterative solvent exchange", J. Am. Chem. Soc. 2010, vol. 132, pp. 17661-17663.

Arnold, M.S., et al., "Enrichment of single-walled carbon nano-tubes by diameter in density gradients", Nano Lett. 2005, vol. 4, pp. 713-718.

Green, A.A., et al., "Colored semitransparent conductive coatings consisting of monodisperse metallic single-walled carbon nanotubes", Nano Lett. 2008, vol. 8, pp. 1417-1422.

Green, A.A., et al., "Isolation of single-walled carbon nanotube enantiomers by density differentiation", Nano Res. 2009, vol. 2, pp. 69-77.

Arnold, M.S., et al., "Sorting carbon nanotubes by electronic structure using density differentiation", Nat. Nanotechnol. 2006, vol. 1, pp. 60-65.

Hersam, M.C., "Progress towards monodisperse single-walled carbon nanotubes", Nat. Nanotechnol. 2008, vol. 3, pp. 387-394.

Green, A.A., "Processing and properties of highly enriched double-wall carbon nanotubes", Nat. Nanotechnol. 2009, vol. 4, pp. 64-70.

Poiesz, B.J., et al., "T-cell lines established from human T-lymphocytic neoplasias by direct response to T-cell growth factor", Proc. Natl. Acad. Sci. USA 1980, vol. 77, pp. 6815-6819.

Shah, S.P., et al., "Exploration of fracture characteristics, nano-scale properties and nanostructure of cementitious matrices with carbon nanotubes and carbon nanofibers", In Proceedings of the 7th International Conference on Fracture Mechanics of Concrete and Concrete Structures, 2010.

Shah, S.P., et al., "Nanoscale modification of cementitious materials", In Proceedings of the 3rd International Symposium on Nanotechnology in construction, Springer, 2009, pp. 125-130.

Konsta-Gdoutos, M.S., et al., "Nanoimaging of highly dispersed carbon nanotube reinforced cement based materials", Seventh Intnl. RILEM Symp. on Fibre Reinforced Concrete: Design and Applications, 2008. pp. 125-131.

Metaxa, Z.S., et al., "Carbon nanofiber-reinforced cement-based materials", Transportation Research Record: Journal of the Transportation Research Board 2142, 2010, pp. 114-118.

\* cited by examiner

HIGHLY CONCENTRATED NANO-REINFORCEMENT SUSPENSIONS FOR CEMENTITIOUS MATERIALS AND METHOD OF REINFORCING SUCH MATERIALS

This application is a continuation-in-part of U.S. Ser. No. 12/322,842 filed Feb. 6, 2009, which claims benefits and priority of U.S. provisional application Ser. No. 61/027,160 filed Feb. 8, 2008, the disclosures of which are incorporated herein by reference.

GOVERNMENT RIGHTS

The invention was made with government support under grant numbers DMR-0706067 and DMR-1006391 awarded by the National Science Foundation. The Government has certain rights in the invention.

FIELD OF THE INVENTION

The invention relates to a method for concentrating nano-reinforcements, such as multi-walled and single-walled carbon nanotubes, graphene oxide sheets, and other nano-reinforcements in suspension for use in making cementitious or other composites as well as to the concentrated suspensions and composite cementitious or other products.

BACKGROUND OF THE INVENTION

The utilization of highly dispersed multi-walled carbon nanotubes (MWCNTs) in cementitious materials has shown to substantially improve the mechanical and other properties of the cementitious matrix. For example, copending patent application U.S. Ser. No. 12/322,842 filed Feb. 6, 2009, discloses that the utilization of highly dispersed carbon nanotubes (CNTs) in cementitious materials substantially improves the performance of the cementitious matrix. In particular, by adding a very low amount of MWCNTs or carbon nanofibers (CNFs), at concentrations of 0.025 wt. % to 0.08 wt. % of cement, the strength and stiffness of cement beams increases significantly [U.S. Ser. No. 12/322,842 and references 1-6]. The application of low concentration of MWCNTs and CNFs enables the control of matrix cracks at the nanoscale level [reference 7]. Also, the cost of CNTs at such low concentrations is comparable or lower than that of conventional reinforcement which makes the introduction of CNTs in concrete economically feasible. In addition to the benefits of reinforcement, autogenous shrinkage tests have demonstrated that MWCNTs can also have beneficial effects on the early age strain capacity of cementitious materials, which leads to improved durability of the cement matrix [reference 1].

The current preparation method of MWCNT suspensions for use in cementitious materials includes a one step technique involving the application of ultrasonic energy and the use of a commercially available surfactant to disperse the MWCNTs in the mixing water prior to their addition to cement [U.S. Ser. No. 12/322,842 and references 2, 8]. However, in order to have widespread use of MWCNT-cement nanocomposites, there is a need to produce MWCNT suspensions in large scale production for full-scale application in concrete to decrease the transportation and storage cost of the large volume suspensions for this application.

A number of solution-phase processes exist where carbon nanomaterials, such as CNTs and graphene flakes, are concentrated by the removal of their solvent. This can be achieved by precipitation via addition of organic solvent and vacuum filteration [9], solvent exchange utilizing polymer-organic solvent [10] and sedimentation and decantation by ultracentrifugation [11]. Among these processes, the ultra-centrifugation method is ideal due to its simplicity and also for applications where the introduction of organic solvents will become a hindrance. Ultracentrifugation process has been proven as a facile method to increase the concentration of CNTs in aqueous solutions prior to being used in a technique called density gradient ultracentrifugation (DGU). DGU is a solution phase purifying technique that is widely used to separate various forms of carbon nanomaterials by their physical and electronic structures, which depend on the subtle buoyant densities of different species [12-16]. In this technique, the materials of interest are suspended in an aqueous solution and layered within a density gradient, thus their high initial concentration is essential for the optimal yield of separation after ultracentrifugation. To address this issue, a preparative ultracentrifugation process called pelleting, which is generally used to sediment solidified organic compounds out of solutions, has been adapted from biology [17-18]. During this technique, nanomaterials in aqueous suspensions are presented under a centrifugal force inside a tube and travel towards the bottom at certain sedimentation rate, forming a highly concentrated region which can be recovered after decantation.

SUMMARY OF THE INVENTION

In an embodiment of the present invention, a method is provided for providing concentrated MWCNT and other nano-reinforcement suspensions for applications as admixtures in cement based materials. An illustrative embodiment of the invention involves dispersing nano-reinforcements in an aqueous solution containing a surfactant to form a suspension and subjecting the suspension to centrifugation to form a concentrated suspension of nano-reinforcements followed by removal of excess solution from the container, leaving a centrifuged and concentrated mass of nano-reinforcements which can be subsequently used as admixtures with cement base materials to form composite material.

Another embodiment of the present invention provides a method of making such a cement based composite using the concentrated suspension of MWCNT or other nano-reinforcements wherein the dispersibility of the MWCNT suspension and its contribution in reinforcing the cementitious matrix is maintained and can be used effectively for large-scale production of cementitious admixtures. An illustrative method involves diluting the centrifuged and concentrated mass of nano-reinforcements to form an aqueous suspension and mixing the suspension with a cementitious material to form a composite material. Practice of embodiments of the invention by mixing suspensions of MWCNT reinforcements with cement based material yield similar strength and even marginally higher modulus of elasticity as compared to materials prepared using the non-concentrated suspensions.

The present invention provides a centrifuged and concentrated mass of nano-reinforcements (e.g. concentrated carbon nanotube suspension) that can find wide applications for highway structures, bridges, pavements and in general in all applications of conventional and high strength concrete, as well as in manufactured precast elements for residential and commercial buildings. The centrifuged and concentrated mass can be shipped dry or wet or re-suspended in water to users. Potential users of the masses or suspensions are concrete plants across the world, individual users, national and international contractors, developers and construction companies. The method for preparing highly dispersed and concentrated MWCNTs will be advantageous and useful to cement manufacturers and companies that develop admixtures for concrete or supplementary cementitious materials.

Other advantages of the present invention will become more apparent from the following detailed description taken with the following drawings.

DETAILED DESCRIPTION OF THE INVENTION

Figure 1:
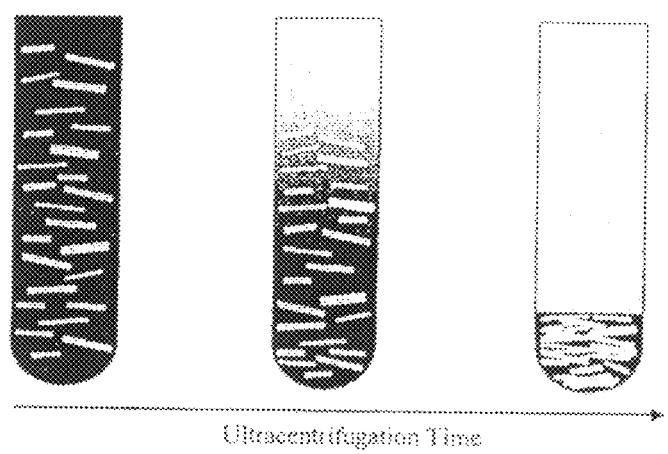
FIG. 1 is a schematic figure showing the progression of sedimentation of nanomaterials inside a tube during ultracentrifugation time

The present invention involves a method for the preparation of highly concentrated MWCNT suspensions. The invention can be practiced to prepare highly concentrated suspensions of other nano-reinforcements including, but not limited to, single-walled carbon nanotubes, graphene sheets, graphene oxide sheets, and carbon nanofibers. For purposes of illustrating and not limiting the invention, the method is descried below and employed to reduce the amount of water in a MWCNT/water/surfactant suspension, increasing the MWCNT concentration in a final suspension.

Two ultracentrifuge rotors, the swing bucket and the fixed angle rotor, were used to highly concentrate the suspensions. Ultracentrifugation as used herein means a process of spinning these rotors at a significantly high speed of greater than about 10,000 rpm, producing an amplified effective gravitational force field for the contained samples. Optical absorbance spectroscopy was used to evaluate the concentration of the suspensions after ultracentrifugation. Cement paste samples were prepared using the highly concentrated MWCNT suspensions after they were diluted in water. Three point bending tests were performed in order to assess the effect of the concentration method on the mechanical properties of the produced nanocomposites. The results of the nanocomposites reinforced with the highly concentrated/diluted MWCNT suspensions were compared with the respective nanocomposites produced with the initial, non-concentrated MWCNT suspensions.

Illustrative Method of Producing MWCNT Suspension in Water:

Purified multiwalled carbon nanotubes (MWCNTs), produced by the chemical vapor deposition method (CVD), with a diameter of about 20-40 nm, length of about 10-30 μm and purity >95% were used as received. The suspensions were prepared using MWCNTs at a concentration of 0.26 wt % which were dispersed in an aqueous solution containing a surfactant to MWCNTs weight ratio of 4.0. The mixture was then ultrasonicated using a 500 W cup-horn high intensity ultrasonic processor with a 13 mm diameter tip, operating at 50% of its maximum amplitude delivering 1900-2100 J/min. Energy was applied in cycles of 20 sec to prevent the suspensions from overheating.

Laboratory Scale Concentration Method for MWCNT Suspension:

Ultracentrifuges are typically available with a wide variety of rotors suitable for a great range of experiments. The most widely used configurations of rotors are the swing bucket and the fixed angle. The swing bucket rotors allow the tubes to hang on hinges so that they spin perfectly horizontally [reference 19]. During ultracentrifugation the material travels down the entire length of the centrifuge through the media within the tube [reference 20]. Fixed angle rotors contain cavities that hold the tubes at a predetermined angle [reference 19]. The materials are forced against the side of the centrifuge tube, and then slide down the wall of the tube [reference 20]. In this experiment, the effectiveness of the swing bucket and fixed angle rotors for concentrating MWCNT suspensions was investigated.

Figures 2A, 2B, 2C:
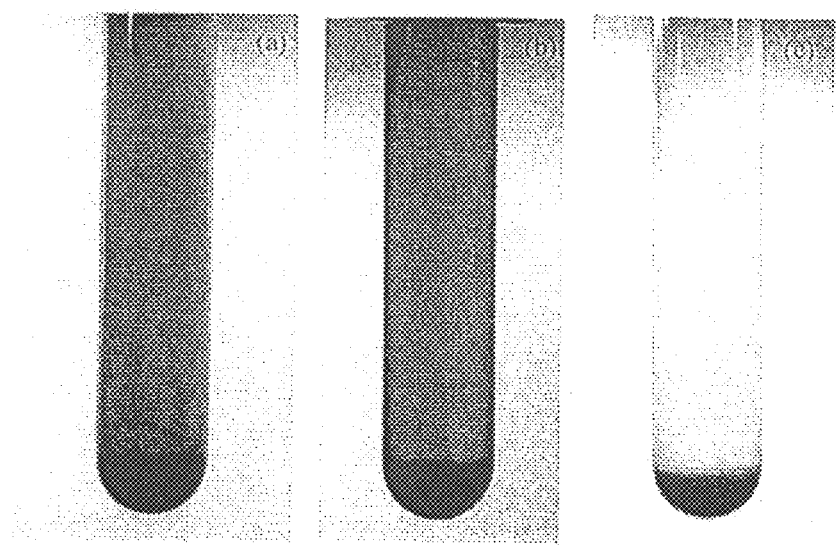
FIGS. 2a, 2b, 2c depict MWCNTs suspensions ultracentrifuged for 30 min, 45 min and 60 min, respectively.

Following dispersion as described above, the suspensions were concentrated by ultracentrifugation. Initially, sedimentation of the MWCNTs was explored using a swing bucket SW41 rotor (from BeckmanCoulter) with ambient temperature at 22° C. and at 41,000 r.p.m. using centrifuge tubes that can hold 12 ml of suspension. In the aforementioned DGU process, OptiPrep containing 60% (w/v) of iodixanol was used as the density medium for the concentration process to increase the viscosity of concentrated dispersion for the subsequent density gradient separations. However, since the MWCNTs used have a density of 2.1 g/ml which is higher than the density of OptiPrep (1.32 g/ml) and furthermore there is no need for their viscosity adjustment, the suspensions in water with uniform density were simply added to the centrifugation tubes. The sedimentation of the MWCNTs was monitored at 30, 45 and 60 min. FIGS. 2a, 2b, 2c show photographs of the centrifuged tubes for various durations of ultracentrifugation. At centrifugation times of 30 min and 45 min, the nanotubes started to concentrate at the bottom of the tube. At 60 min, the suspension was fully sedimented at the bottom of the tube.

After centrifugation, the supernatant solution was decanted down to approximately 2 cm from the bottom of the tube, enabling retrieval of 2.5 ml of concentrated suspension, which corresponds to about 20% of the total volume of the suspension. The concentration of MWNTs in the solution before and after centrifugation was quantified using optical absorbance spectroscopy (OAS). It was observed that the absorption of the suspension after centrifugation was lower than the sample before centrifugation. Several researchers have reported that the presence of MWCNTs agglomerates causes a decrease in the absorption spectrum because the MWCNTs bundles do not optically absorb in the wavelength region between 200 and 1200 nm [reference 21]. After a close observation of the samples, it was seen that a solid pellet of MWCNTs formed at the bottom of the tube within the residual water, causing the agglomeration of the MWCNTs and thus the reduction of the absorption.

In an optimized experiment, the MWCNT suspension was ultracentrifuged at 20,500 r.p.m. and it was observed that the MWCNTs had fully concentrated at the bottom of the tube after four hours. After ultracentrifugation and decantation, the hardened pellet of concentrated MWCNTs and surfactant-encapsulated MWNTs were re-suspended by ultrasonication inside the centrifuge tube submerged in an ice bath using the Sonic Dismembrator 500 from Fisher Scientific with a ⅛" microtip attachment at 20% power for 5 min.

The aforementioned technique can load approximately 12 ml of MWCNT suspension per ultracentrifuge tube, which limits the yield of concentrated materials and precludes even the production of laboratory scale specimens. To be able to apply the method to cementitious samples, higher scale ultracentrifugation preferably should be employed to increase the loading and yield.

Scale Up of the MWCNT Concentration Method:

A preliminary investigation of scaling up the process with two larger capacity rotors was performed. Firstly, a swing bucket Ti 32 rotor was used, which can hold tubes of 38 ml capacity. The samples were centrifuged for 11 hours at 28,000 r.p.m to make sure of complete sedimentation of the MWCNTs at the bottom of the centrifuge tubes. After centrifugation, the supernatant solution was decanted from the tube, leaving 7.6 mL, or 20% of initial solution, of concentrated suspension. The remaining material was re-suspended by ultrasonication at 25% power for 40 min.

The second rotor studied was the JLA-16.250 fixed-angle style rotor, which can hold about 200 ml per tube. The samples were centrifuged for 11 hours applying 14,000 rpm which is close to the maximum speed of the rotor. Generally, substances in a fixed rotational environment precipitate faster with fixed angle rotors [reference 20]. The speed and the time of ultracentrifugation were estimated by calculating the cut-off threshold for sedimentation rate of MWCNTs, using the geometry of the rotors used and their average gravitational force applied so as to simulate the laboratory scale procedure. Though, complete sedimentation was not achieved. The material primarily sedimented at the side of the tube. Thus, during decantation, some MWCNTs were removed from the mix. After decantation, the remaining 50 ml of concentrated suspension was ultrasonicated at 40% power for 90 min to re-disperse any MWCNTs agglomerates created by the process.

Preparation of Cementious Composite Specimens:

After concentration, the MWCNT suspensions were diluted back to their initial concentration by adding the same amount of water that was removed during decantation. The diluted suspensions were then used to prepare cementitious samples with Type I ordinary Portland cement (OPC), at a water to cement ratio (w/c) of 0.3. The materials were mixed using a standard Hobart mixer following the procedure outlined by the ASTM 305. After mixing, the paste was placed in 20×20×80 mm molds. After demolding, the samples were cured in water saturated with lime until testing.

Characterization:

Initial evaluation of the concentration of MWCNTs in the aqueous surfactant solution was performed by optical absorbance spectroscopy (OAS). The test was conducted at a wavelength range of 260 nm to 400 nm using a Cary 5000 UV-Vis-NIR spectrophotometer from Varian Instruments. Three-point bending tests of beams with a 6 mm notch cut at the midspan were performed to investigate the effect of the different concentration techniques on the mechanical properties of cement based nanocomposites reinforced with MWCNTs. Following the testing procedure described in [reference 2], the beams were tested at the age of 3, 7 and 28 days. Based on ASTM C 348, three specimens were tested for each curing age. The tests were performed with a closed-loop MTS servo-hydraulic testing machine with a 20 kip (about 89 kN) capacity. A crack mouth opening displacement extensometer was used to control the test with a constant opening velocity of 0.009 mm/min. Load versus CMOD graphs were created from the test results. Young's modulus was then calculated from these graphs using the two-parameter fracture model by Jenq and Shah [reference 22]. Flexural strength was calculated using the net specimen depth.

Figure 3:
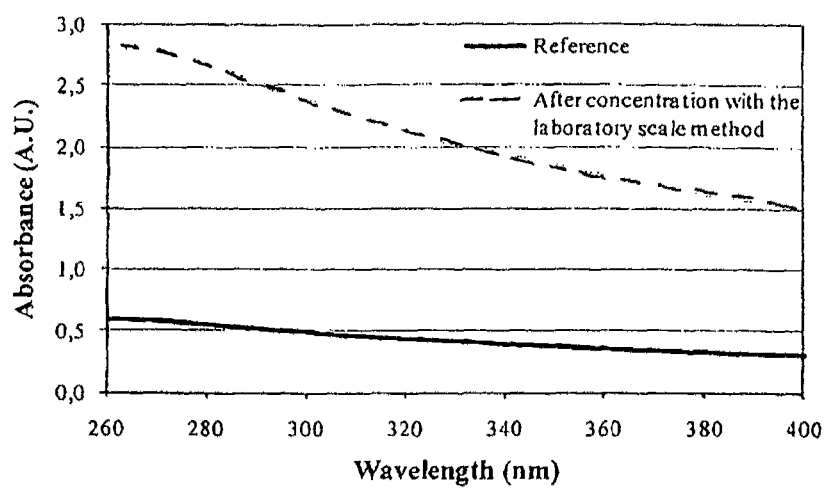
FIG. 3 shows optical absorbance spectra of MWCNTs suspensions before and after concentration using the laboratory scale method (swing bucket SW41 rotor)

Results-Absorbance Spectra:

The results of the absorbance spectra of the suspensions before and after centrifugation using the laboratory method (swing bucket SW41 rotor) are presented in FIG. 3. The UV/visible spectra display an increasing absorbance with a maximum around 261 nm, attributed from the graphitic $\pi$-plasmon resonance. For the concentrated suspension, the peak is not as well distinguished, indicating that the MWCNTs are relatively more bundled. The concentration of MWCNTs in the suspensions has been correlated using Beer's law, which illustrates a linear relationship between the optical absorbance and concentration of substance. Generally, the intensity of the corresponding spectra depends on the concentration of CNTs, samples with higher concentration exhibit higher absorbance [reference 21]. At the wavelength of 280 nm, it is observed that the absorbance of the concentrated suspensions is approximately five times higher than that of the samples before centrifugation, indicating that the concentration of MWCNTs greatly increased. This promising result suggests that this method, which involves ultracentrifugation, decantation and ultrasonication of the remaining suspensions, can be used to effectively concentrate the MWCNT suspensions creating a MWCNT admixture for cement based materials.

Figure 4:
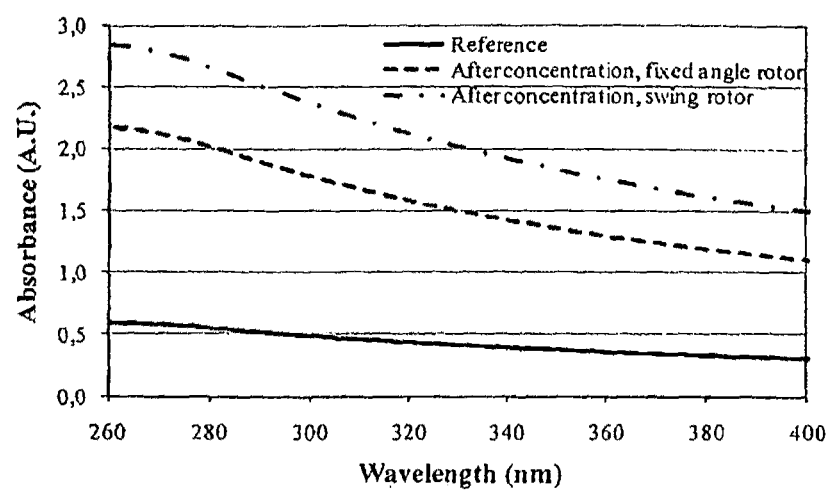
FIG. 4 shows optical absorbance spectra of MWCNTs suspensions concentrated using the swing bucket Ti 32 and the fixed angle JLA-16.250 rotors

FIG. 4 depicts the results of the absorbance spectra of the samples concentrated using either the swing bucket Ti 32 or the fixed angle JLA-16.250 rotors. The results of the reference suspensions are shown for comparison. It is observed that for the samples concentrated using the swing configuration the absorption spectra is substantially higher, for example at a wavelength of 280 nm the absorbance increases approximately by a factor of five, from 0.54 A.U. to 2.70 A.U. This is in a very good agreement with the small scale tests, shown previously in FIG. 3. Nevertheless, the absorption in the samples concentrated using the fixed angle rotor was increased only by a factor of three, which can be attributed to the loss of MWCNTs during decantation.

Figure 5:
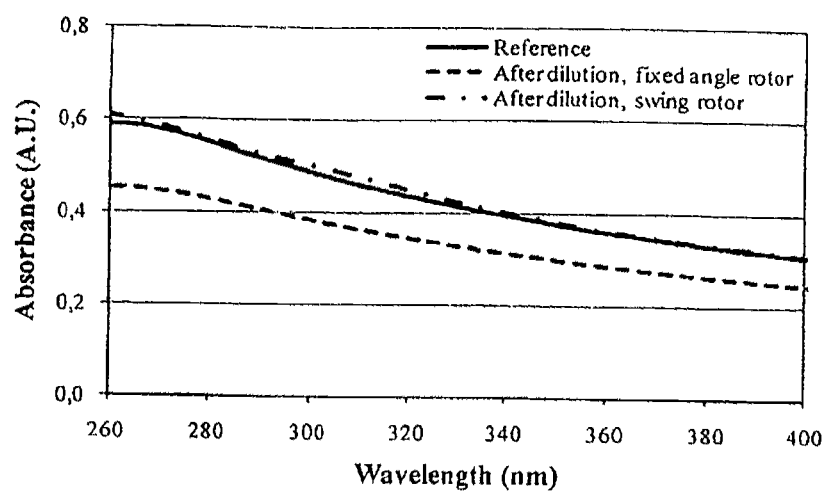
FIG. 5 shows optical absorbance spectra of MWCNTs suspensions after dilution that were concentrated using the swing bucket Ti 32 and the fixed angle JLA-16.250 rotors

The produced admixtures were then diluted with water and mixed with the cement following the ASTM 305 standard. The absorbance spectra of the samples after dilution compared to the reference suspension are shown in FIG. 5. As observed, the concentrated samples using the swing configuration exhibit the same concentration as the control mix. This implies that no MWCNTs were lost during the concentration procedure and the pellet was fully redispersed. However, the samples prepared using the fixed angle rotor show lower absorbance. This indicates that the concentration of MWCNTs in those solutions is lower compared to the initial suspensions and the concentrated suspensions prepared using the swing bucket rotor.

Figure 6:
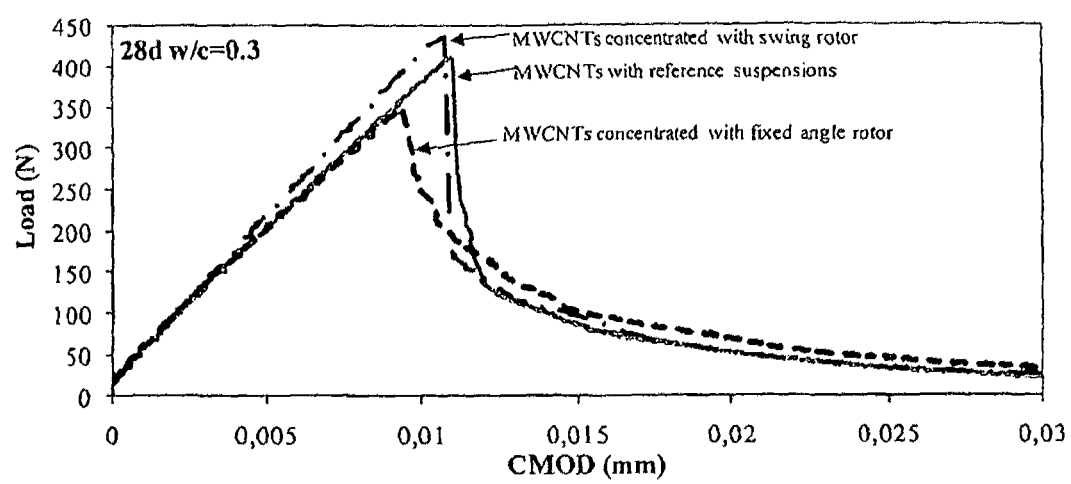
FIG. 6 shows typical load-CMOD curves for 28 day cement paste reinforced with the reference nonconcentrated suspensions and cement paste reinforced with the concentrated MWCNTs suspensions prepared using the Ti 32 swing bucket and the JLA-16.250 fixed angle rotors, respectively. CMOD is crack mouth opening displacement.
Figure 7A:
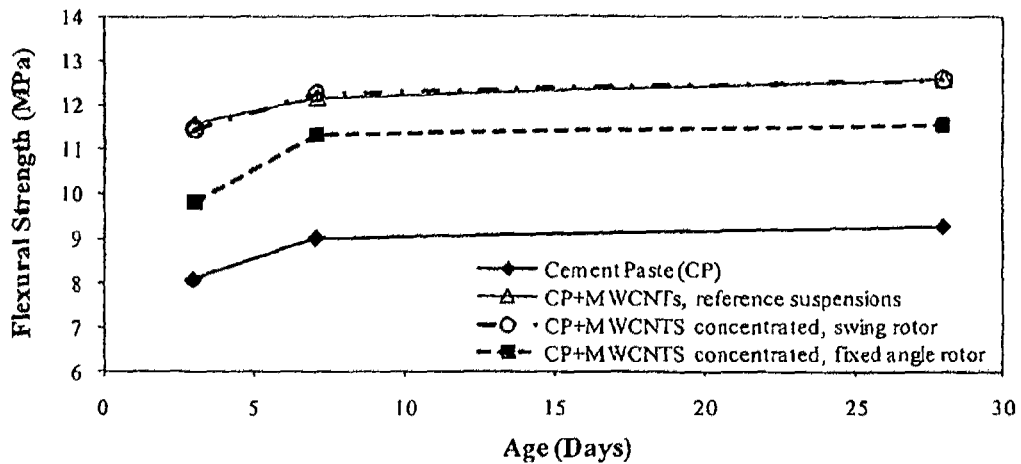
FIGS. 7a and 7b show effect of admixtures prepared using different ultracentrifugation methods on flexural strength and Young's modulus of cement paste (w/c=0.3), respectively.
Figure 7B:
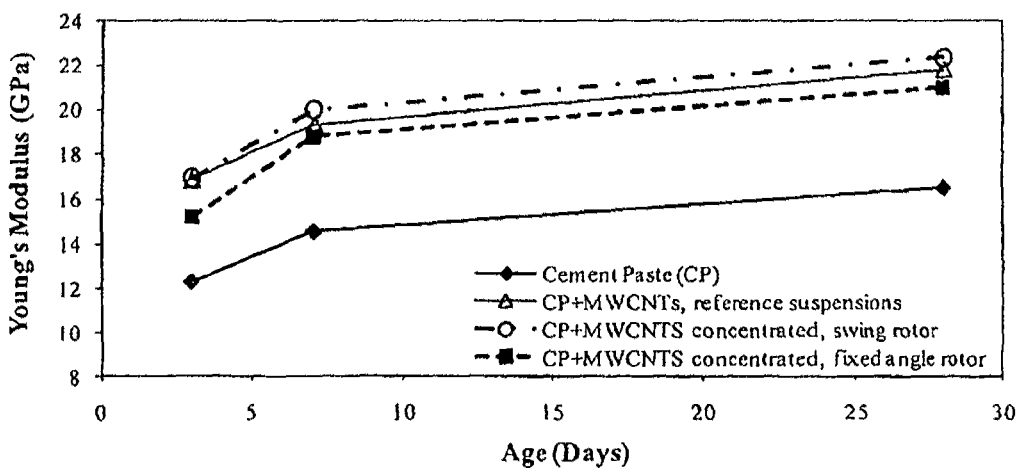

Cement Composite Mechanical Properties:

The effectiveness of the two different concentration methods was evaluated by three-point bending tests. FIG. 6 shows typical load-CMOD curves of the investigated samples. FIGS. 7a and 7b depict the results of the flexural strength and the Young's modulus of nanocomposites with MWCNT that were concentrated using the swing bucket and the fixed angle rotors at the age of 3, 7 and 28 days. The results of cement paste samples reinforced with the reference suspensions, without concentration and the results of the plain cement paste samples are also depicted for comparison. In all cases, the samples reinforced with MWCNTs exhibit higher flexural strength and Young's modulus when compared to the plain cement paste. The samples prepared using the swing bucket rotor show a very similar flexural strength at all curing ages when compared with the initial reference suspensions. The Young's modulus of these specimens after 3 days of hydration is almost the same as the Young's modulus of the reference sample at the same curing age. However, at 7 and 28 days of hydration the samples reinforced with the highly concentrated/diluted MWCNT suspensions demonstrate an even slightly higher Young's modulus than the reference samples. The specimens prepared from the suspensions created using the fixed angle rotor exhibited a lower flexural strength and slightly lower Young's modulus than those prepared by the swing bucket rotor. This is expected because the suspensions prepared using the fixed angle rotor, under the test condition employed in the research reported here, had a lower concentration of MWCNTs than the suspension prepared using the swing bucket rotor. This suggests that the swing bucket rotor is more efficient for the concentration of MWCNT suspensions because these suspensions do not lose any CNTs during the admixture preparation process.

From the above examples, it is apparent that the present invention provides a method for the production of highly concentrated MWCNT suspensions that can be used as admixture in fabricating cementitious nanocomposites has been developed. It has been demonstrated, by optical absorbance spectroscopy, that the swing bucket rotor centrifugation can be used to effectively concentrate the MWCNTs suspensions, increasing the concentration of the MWCNTs by approximately five times. The produced suspensions were then diluted and used as admixture in the cementitious matrix. Specimens cast using suspensions prepared by the swing bucket rotor have been shown to outperform specimens prepared using the fixed angle rotor. Also, they exhibited similar flexural strength and marginally higher stiffness at 7 and 28 days, when compared to samples prepared using the non-concentrated suspensions.

The following detailed EXAMPLES set forth below provide more information on the method for concentrating the MWCNT suspensions and also a method for concentrating graphene oxide sheet nano-reinforcements in aqueous solution.

EXAMPLES

MWCNT—Concentration

Example 1

Concentration Step Via SW 41 Rotors (L-80XP)

1. Ultracentrifuge tubes (12 ml max. capacity) were filled with the horn ultrasonicated MWCNT/superplasticizer solution prepared as described above and pursuant to copending U.S. patent application Ser. No. 12/322,842, which is incorporated herein by reference.
2. Optima L-80 XP Ultracentrifuge with SW41 rotors was used to concentrate the above MWNT suspensions,
    Optimized centrifugation condition is the following: 20.5 krpm for 4 hours
3. After the centrifugation, the solution inside the tube was decanted down to 2 cm from the bottom of the tube
4. The remaining solution of approximately 2.5 ml containing the MWCNT pellet was horn ultrasonicated (Fisher Scientific Model 500 Sonic Dismembrator) using 0.125" diameter microtip extension at 20% of its maximum amplitude for 5 minutes and 30 seconds, which re-dispersed most of the pellet.
5. Absorbance spectra (Cary 5000 UV-Vis-NIR spectrophotometer) before and after the concentration step was measured to quantify the increase in concentration in terms of optical density
    Obtained 4.81 times concentrated solution compared to the initial solution before the centrifugation
    Took absorbance value at wavelength of 300 nm
    Initial concentration: 2.6 mg/ml
    Absorbance before concentration: 62.78
    Absorbance after concentration: 301.99

Example 2

Concentration Step Via SW 32 Rotors (L-80XP)

1. Ultracentrifuge tubes (38 ml max. capacity) were filled with the horn ultrasonicated MWCNT/superplasticizer solution prepared as described above and pursuant to copending U.S. patent application Ser. No. 12/322,842, which is incorporated herein by reference.
2. Optima L-80 XP Ultracentrifuge with SW32 rotors was used to concentrate the above MWCNT suspensions.
    Optimized centrifugation condition: 28 krpm for 6.5 to 11 hours for complete sedimentation
3. After the centrifugation, the solution inside the tube was decanted from the tube, leaving 7.6 ml, or 20% of initial solution, of concentrated suspension.
4. The remaining solution of approximately 7.6 ml containing the MWNT pellet was horn ultrasonicated (Fisher Scientific Model 500 Sonic Dismembrator) using 0.125" diameter microtip extension at 25% of its maximum amplitude for 40 minutes, which re-dispersed most of the pellet
5. Absorbance spectra (Cary 5000 UV-Vis-NIR spectrophotometer) before and after the concentration step was measured to quantify the increase in concentration
    Obtained 4.87 times concentrated solution compared to the initial solution before centrifugation
    Took absorbance value at wavelength of 300 nm Example 3

Concentration Step Via JLA 16.025 Rotors (J-26 XPI)

1. Each centrifuge tube (200 ml max. capacity) with the horn ultrasonicated MWCNT suspension prepared as described above and pursuant to copending U.S. patent application Ser. No. 12/322,842, which is incorporated herein by reference.
2. Avanti J-26 XPI Centrifuge with JLA 16.025 rotors was used to concentrate the above MWCNT suspensions.
3. Centrifugation condition: 14 krpm for 11 hours.
4. The solution was decanted until about 50 mL of solution is left in the container
5. The remaining solution was horn ultrasonicated at 40% power for 1 hour and 30 minutes.
6. Absorbance spectra was measured before and after the concentration step to quantify the increase in concentration Obtained 3.13 times concentrated solution compared to the initial solution before centrifugation Example 4

Graphene Oxide Suspension

Graphene oxide was produced by a modified Hummer's Method described in Hummers W S, Offeman R E. Preparation of Graphitic Oxide. J. Am. Chem. Soc. 1958; 80: 1339, as follows:
1. Graphite flakes (Asbury 3061) were mixed with $H_2SO_4$ and $KMnO_4$ the initial reaction with the following ratio:
Graphite: 2.06 g
$H_2SO_4$: 88.21 g
$KMnO_4$: 6.25 g
2. Reaction was occurred in heated water bath of 35° C.
3. The solution was stirred for 2 hours.
4. DI water was added in sequence of: 95.88 mL, 291.81 mL
5. 30% $H_2O_2$ was added: 5.21 ml
6. The solution was stirred for 15 minutes
7. The solution was transferred into two Polypropylene tubes (250 mL) and centrifuged in Avanti J-26 XPI using JS-7.5 rotor: 3000 rpm×10 mins+5000 rpm×15 mins
8. The supernatant was pipetted out
9. about 200 g of DI+HCl (10:1) solution was added
10. The mixture was centrifuged three times at 6000 rpm for 10 mins
11. After the last step, the solution was divided into 8 tubes in 45 ml, and they were centrifuged until they reached neutral pH
12. The GO pellet was diluted with water and bath sonicated for 4.5 hours The invention provides a simple method for preparing highly concentrated multi-walled carbon nanotube (MWCNT) and other nano-reinforcement suspensions, for applications as admixtures in cement based materials. Ultra-centrifugation process was employed to increase the concentration of the MWCNTs dispersed with surfactant in an aqueous solution by removal of solvent, which will lead to reduction in cost and increase in efficiency of transportation and storage of such suspensions. The centrifuged and concentrated mass can be shipped dry or wet or resuspended in water to users. Two different ultracentrifuge rotors, the swing bucket and the fixed angle rotor, were used. The concentration of the produced suspensions was quantified using optical absorbance spectroscopy. It was found that the ultracentrifugation process enhanced the concentration of the MWCNT suspension by five times. To evaluate the effectiveness of the concentration process, three point bending tests were conducted on nanocomposites produced using suspensions before and after ultracentrifugation. Specimens cast using the swing bucket concentrated suspensions exhibited similar flexural strength and marginally higher stiffness compared to the samples prepared using the non-concentrated suspensions. These results demonstrate that the ultracentrifugation concentration method preserves the solubility of the MWCNT suspension and its contribution in reinforcing the cementitious matrix and thus it is an effective preparation step for large-scale production of such admixtures.

Although the invention has been described in connection with certain embodiments thereof, those skilled in the art will appreciate that changes and modifications can be made therein within the scope of the invention as set forth in the appended claims.

REFERENCES WHICH ARE INCORPORATED HEREIN BY REFERENCE

[1] Konsta-Gdoutos M S, Metaxa Z S, Shah S P. Multi-scale mechanical and fracture characteristics and early-age strain capacity of high performance carbon nanotube/cement nanocomposites. Cem. Concr. Compos. 2010; 32 (2): 110-115.
[2] Konsta-Gdoutos M S, Metaxa Z S, Shah S P. Highly dispersed carbon nanotube reinforced cement based materials. Cem. Concr. Res. 2010; 40: 1052-1059.
[3] Metaxa Z S, Konsta-Gdoutos M S, Shah S P. Carbon nanotubes reinforced concrete. ACI Special Publication 267 2009; (267): 11-20.
[4] Metaxa Z S, Konsta-Gdoutos M S, Shah S P. Carbon nanofiber-reinforced cement-based materials. Transportation Research Record: Journal of the Transportation Research Board 2142, 2010; (2142): 114-118.
[5] Shah S P, Konsta-Gdoutos M S, Metaxa Z S. Exploration of fracture characteristics, nanoscale properties and nanostructure of cementitious matrices with carbon nanotubes and carbon nanofibers. In Proceedings of the 7th International Conference on Fracture Mechanics of Concrete and Concrete Structures (2010).
[6] Shah S P, Konsta-Gdoutos M S, Metaxa Z S, Mondal P. Nanoscale modification of cementitious materials. In: Bittnar Z, Bartos P J M, Nemecek J, Smilauer V, Zeman J, editors. Nanotechnology in construction 3. Proceedings of the Third International Symposium on Nanotechnology in construction. Springer, 2009: 125-130.
[7] Metaxa Z S, Konsta-Gdoutos M S, Shah S P. Mechanical properties and nanostructure of cement-based materials reinforced with carbon nanofibers and polyvinyl alcohol (PVA) microfibers. ACI Special Publication 270 2010; (270): 115-124.
[8] Konsta-Gdoutos M S, Metaxa Z S, Shah S P. Nanoimaging of highly dispersed carbon nanotube reinforced cement based materials. In: Gettu R, editor. Seventh international RILEM symposium on fiber reinforced concrete: design and applications, 2008: 125-131.
[9] Green A A, Hersam, M C. Processing and properties of highly enriched double-wall carbon nanotubes. Nat. Nanotechnol. 2009; 4: 64-70.
[10] Liang Y T, Hersam M C. Highly concentrated graphene solutions via polymer enhanced solvent exfoliation and iterative solvent exchange. J. Am. Chem. Soc. 2010; 132 (50): 17661-17663.
[11] Hersam M C. Progress towards monodisperse single-walled carbon nanotubes. Nat. Nanotechnol. 2008; 3: 387-394.
[12] Arnold M S, Green A A, Hulvat J F, Stupp S I, Hersam M C. Sorting carbon nanotubes by electronic structure using density differentiation. Nat. Nanotechnol. 2006; 1: 60-65.
[13] Green A, Hersam M C. Colored semitransparent conductive coatings consisting of monodisperse metallic single-walled carbon nanotubes. Nano Lett. 2008; 8: 1417-1422.
[14] Green A, Duch M, Hersam M C. Isolation of single-walled carbon nanotube enantiomers by density differentiation. Nano Res. 2009; 2: 69-77.
[15] Arnold M S, Stupp S I, Hersam M C. Enrichment of single-walled carbon nanotubes by diameter in density gradients. Nano Lett. 2005; 5: 713-718.
[16] Antaris A L, Seo J.-W T, Green, A A, Hersam M C. Sorting single-walled carbon nanotubes by electronic type using nonionic, biocompatible block bopolymers. ACS Nano 2010; 4: 4725-4732.

[17] Walker J M, Rapley R. Molecular biology and biotechnology, Cambridge, UK, The Royal Society of Chemistry 2000.
[18] Poiesz B J, Ruscetti F W, Mier J W, Woods A M, Gallo R C. T-cell lines established from human T-lymphocytic neoplasias by direct response to T-cell growth factor. Proceedings of the National Academy of the United States of America 1980; 77: 6815-6819.
[19] Leung, W W F. Centrifugal Separations in Biotechnology. Oxford, Academic Press 2007.
[20] Harisha S. An introduction to practical biotechnology. New Delhi, Laxmi Publication 2006.
[21] Junrong Y, Grossiord N, Koning C E, Loos J. Controlling the dispersion of multi-wall carbon nanotubes in aqueous surfactant solution. Carbon 2007; 45 (3): 618-623.
[22] Shah S P, Swartz S E, Ouyang C. Fracture mechanics of concrete: Application of fracture mechanics to concrete, rock and other quasi-brittle materials. New York, John Wiley and Sons 1995.
[23] Hummers W S, Offeman R E. Preparation of Graphitic Oxide. J. Am. Chem. Soc. 1958; 80: 1339

We claim:

1. A method for producing reinforced cement-based materials comprising a concentrated suspension of multiwall carbon nanotubes (MWCNTs), comprising the steps of:
   (a) providing a first solution, said first solution comprising water and surfactant;
   (b) creating a second solution by dispersing said MWCNTs in said first solution, wherein said second solution has a first UV-vis-NIR absorbance value, and wherein the concentration of MWCNTs in said second solution is less than or equal to 0.16 weight %;
   (c) creating a third solution by ultracentrifuging said second solution,
      wherein said third solution comprises a concentrated portion and a non-concentrated portion,
         wherein said concentrated portion has a second UV-vis-NIR absorbance value, and said second UV-Vis-NIR absorbance value is between 3.13 and 4.87 times said first UV-vis-NIR absorbance value; and
   (d) removing said non-concentrated portion from said third solution to create said concentrated suspension of MWCNTs.

2. The method of claim 1 wherein dispersing occurs by ultrasonication.

3. The method of claim 1 wherein ultracentrifuging utilizes a swing bucket rotor.

4. The method of claim 1 wherein ultracentrifuging utilizes a fixed angle rotor.

5. The method of claim 1 wherein said concentrated portion is positioned below said non-concentrated portion.

6. The method of claim 1 further comprising the step of adding water to said concentrated suspension of MWCNTs to create a fourth solution.

7. The method of claim 6 wherein the concentration of MWCNTs in said fourth solution is less than or equal to 0.16 weight %.

8. The method of claim 1 wherein said concentrated suspension of MWCNTs comprises non-bundled MWCNTs.

9. The method of claim 1 wherein said MWCNTs are non-chemically functionalized.

\* \* \* \* \*